Feb. 10, 1948. H. BELYEU 2,435,733
SUPPLEMENTAL MOTOR VEHICLE SEAT
Filed June 10, 1946
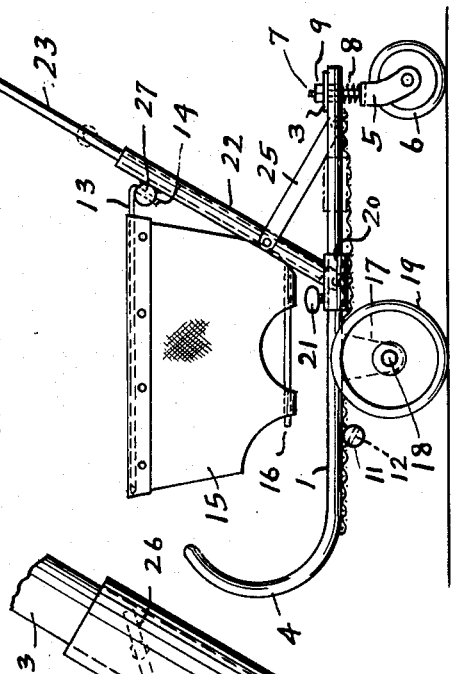
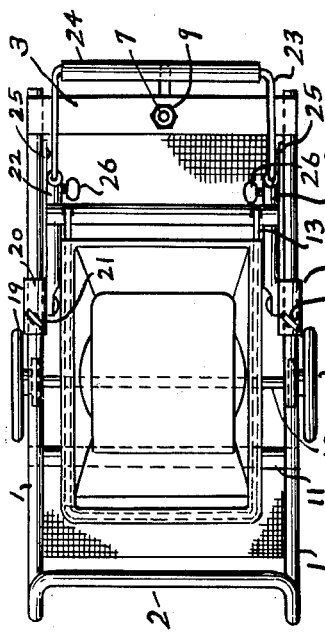
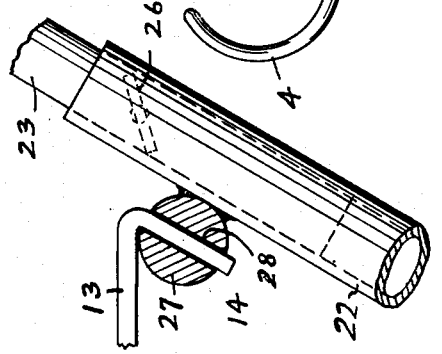
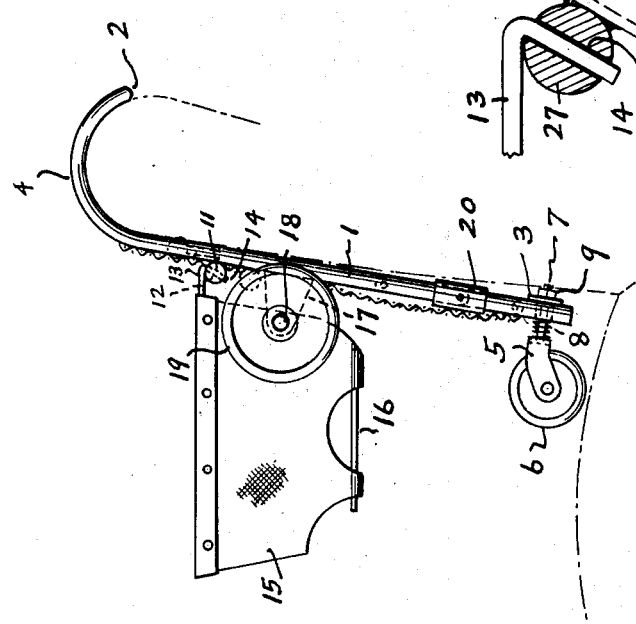
Inventor
Henry Belyeu
By E. J. Hardway,
Attorney

UNITED STATES PATENT OFFICE 2,435,733

SUPPLEMENTAL MOTOR VEHICLE SEAT

Henry Belyeu, Houston, Tex.

Application June 10, 1946, Serial No. 675,541

1 Claim. (Cl. 155—41)

This invention relates to a supplemental motor vehicle seat which has been specially designed for use by small children.

An object of the invention is to provide a seat of the character described which may be conveniently and safely suspended from the back of, and supported on, the conventional automobile seat and which can be safely and comfortably used by small children.

It is another object of the invention to provide a seat of the character described having a supporting frame which may be readily converted so that it may be used as a carriage, or push cart, for children.

With the above and other objects in view the invention has particular relation to certain novel features of construction, arrangement of parts and use, an example of which is given in this specification and illustrated in the accompanying drawings, wherein:

Figure 1 is a side view of the device as converted into a carriage of the push cart type.

Figure 2 is a plan view thereof.

Figure 3 is a side elevation of the device converted into a supplemental motor vehicle seat; and Figure 4 is a fragmentary side view, partly in section, of the frame.

Referring now more particularly to the drawings wherein like numerals of reference designate the same parts in each of the figures, the numerals 1, 1 designate the side bars of a U-frame and the numeral 2 designates the cross bar. The free ends of the side bars 1, 1 are connected by means of a cross brace 3 and at the opposite end of the frame said frame is formed into a hook designated generally by the numeral 4 and which is shaped to conform to the contour of and to fit over the top of the back rest of an automobile seat with the side bars 1, 1 resting against said back rest for support.

There is a fork 5 on which a wheel 6 is mounted said fork having a spindle 7 which extends through the central portion of the brace 3 and around the spindle between the fork 5 and the brace 3 there is a shock absorber in the form of a coil spring 8.

Screwed onto the upper end of the spindle 7 there is a retaining nut 9.

When the device is used as an auxiliary seat the wheel may rest upon the ordinary automobile seat for additional support.

Anchored to the forward sides of the side bars 1 there is a cross rod 11 which is, preferably, welded to the bars 1 and which has forwardly and downwardly declining bearings, as 12, therethrough one at each end.

The seat support is formed of a U-shaped frame 13, the free ends of whose side bars are formed with hooks, as 14, which may be engaged through the bearings 12; and the seat also includes the fabric 15 whose upper margins are folded over the side bars and cross-bar of the seat frame 13 and secured therearound, as indicated in Figures 1 and 3. The lower front portion, and midportion, of the fabric 15 are cut away for free circulation of air and a suitable supporting seat 16 of rigid material forms the bottom of the seat portion to support the occupant, or child, in the supplemental seat, the side cut away portions forming leg spaces.

Anchored to and extending forwardly from the side bars 1 there are the brackets 17, 17 whose free ends have bearings to receive the axle 18. Mounted on the ends of this axle are the carrier wheels 19. When in use as a supplemental seat, as shown in Figure 3, the axle 18 forms a support and brace for the seat 15.

Slidably mounted on the side bars 1 are the sleeves 20, 20. These sleeves may be secured at any point of adjustment on the side bars by means of the set screws 21.

Pivoted to the inner sides of these sleeves there are the upstanding tubes 22, 22 and fitted into the upper ends of said tubes are the side bars 23 of the U-shaped handle whose cross-bar has a suitable grip member 24. There are the oppositely disposed angle braces 25, 25. These angle braces are pivoted, at one end, to the side bars 1, 1, near their free ends, and are pivoted, at their other ends, to the corresponding upstanding tubes 22 above their lower ends.

The side bars 23 may be maintained at any point of adjustment by the set screws 26, 26 which are screwed through the side wall of the tubes 22 near their upper ends.

When the device is used as a supplemental vehicle seat the side bars 23 are telescoped into the tubes 22 as far as possible and secured in said position by the set screws 26 and the set screws 21 are loosened and the tubes 22, 22 are swung around into alignment with, and on the inner sides of the side bars 1, as indicated in Figure 3, and also in dotted lines in Figure 1, so that these parts will be out of the way when the device is to be used as a supplemental seat.

The free ends of the tubes 22, however, are connected by a cross rod 27 which is welded thereto and which has bearings 28 adjacent the ends thereof.

When it is desired to use the device as a push cart the seat 15 may be unhooked from the cross rod 11 and the tubes 22 swung upwardly into the position shown in Figure 1 and the set screws 21 tightened. The side bars 23 may then be drawn out of the tubes 22 the required distance and secured in that position by tightening up on the set screws 26. The hooks 14 of the seat frame may then be fitted through the bearing 28 to suspend the seat 15 and the device may then be conveniently used as a push cart type of baby carriage.

The drawings and description are illustrative merely while the broad principle of the invention will be defined by the appended claim.

What I claim is:

A device of the character described comprising, a main frame having side bars, a brace connecting the free ends of said side bars, the other ends of the side bars being connected by a crossbar and being formed into a hook, sleeves slidable on said side bars, means for securing the sleeves at any selected point of adjustment, tubes whose lower ends are pivoted to said sleeves, a U-shaped handle whose side bars are telescoped into the tubes, releasable means for securing the handle at any selected point of adjustment relative to the tubes, angle braces pivoted, at one end, to the side members of the main frame, and at their other ends to said tubes, a cross rod fastened to said tubes at its upper ends and having bearings, a U-shaped support having side bars whose free ends are formed into hooks which engage through said bearings and a seat depending from said support.

HENRY BELYEU.

REFERENCES CITED

The following references are of record in the file of this patent:

UNITED STATES PATENTS

| Number | Name | Date |
| --- | --- | --- |
| 696,680 | Hunting | Apr. 1, 1902 |
| 1,584,161 | Bear | May 11, 1926 |
| 2,291,640 | Lee | Aug. 4, 1942 |
| 2,359,599 | Allen | Oct. 3, 1944 |